Feb. 25, 1964  F. M. HAGMANN ETAL  3,122,116
SEAL

Filed March 14, 1960  4 Sheets-Sheet 1

INVENTORS
FOSTER M. HAGMANN
HAZEN B. GRAHAM
ROBERT B. MORRIS
By Gulwider Mattingly & Huntley
Attorneys

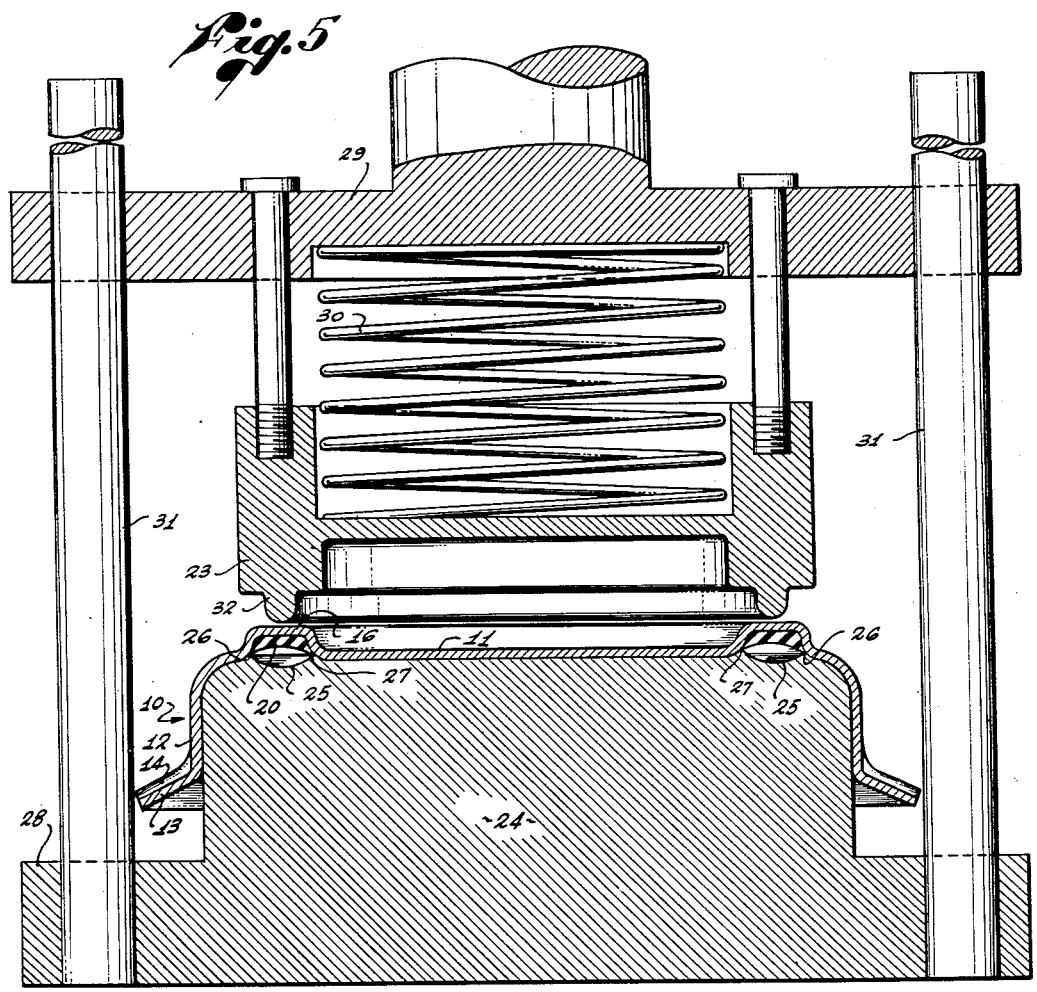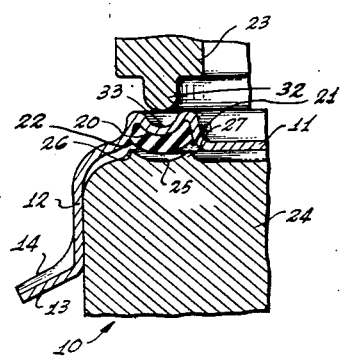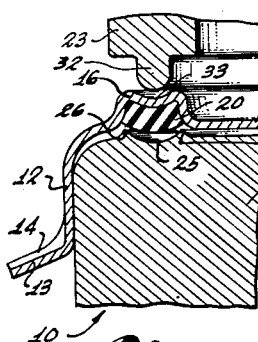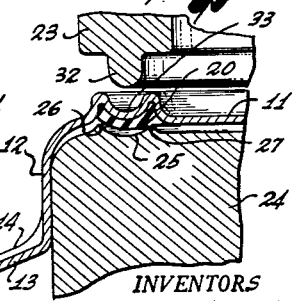

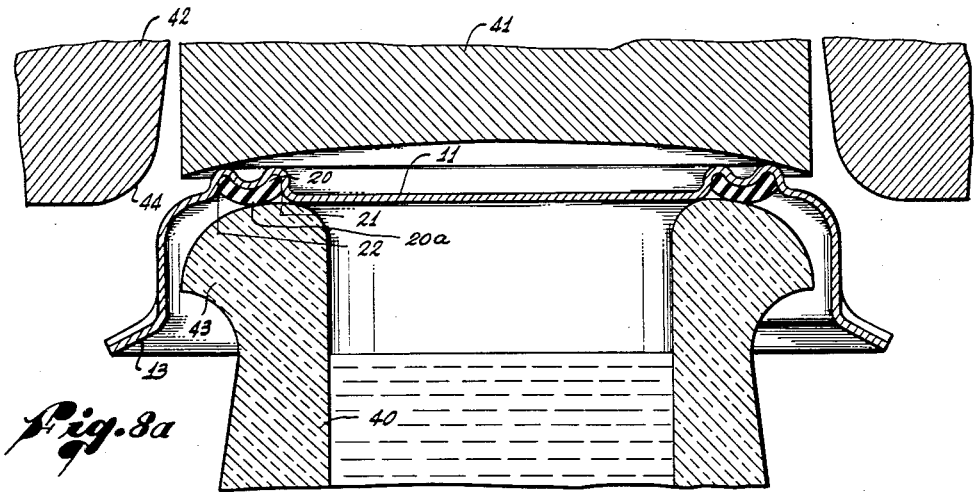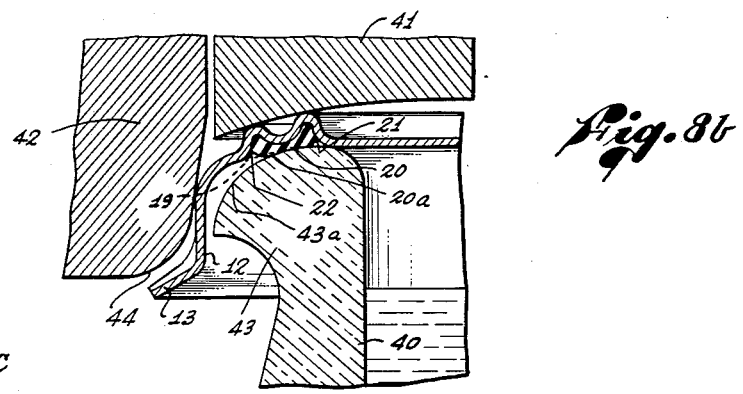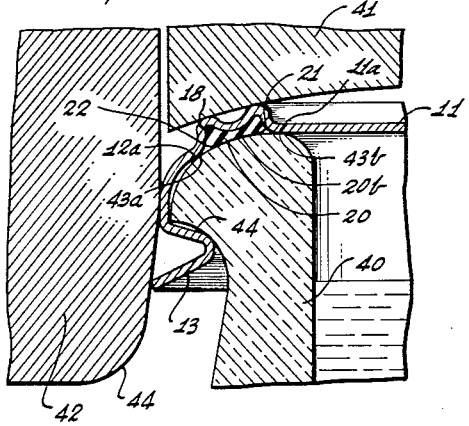

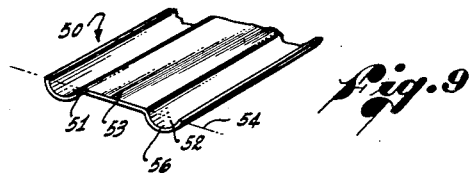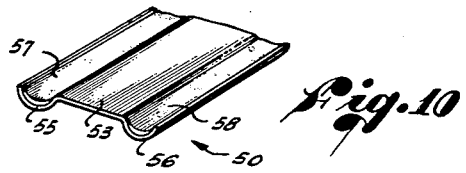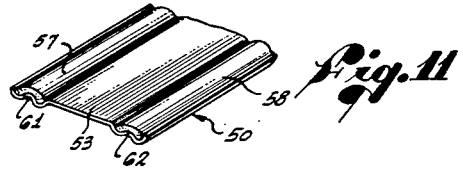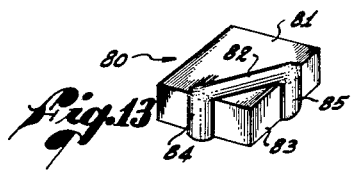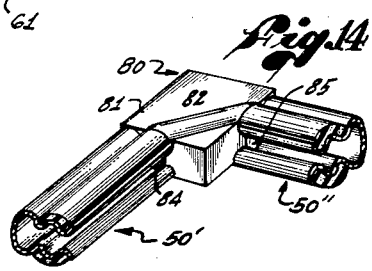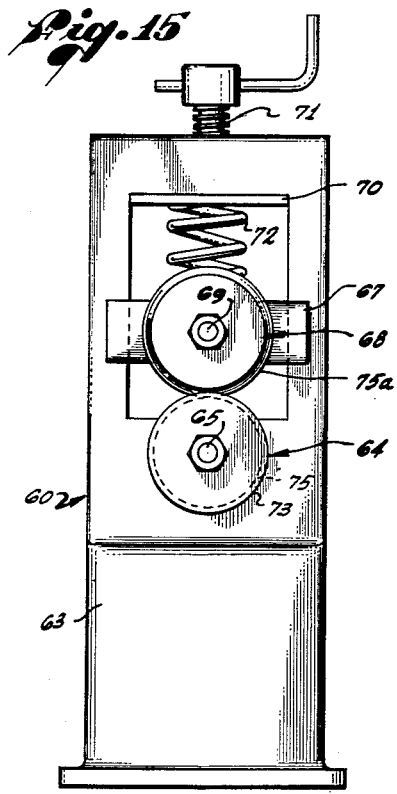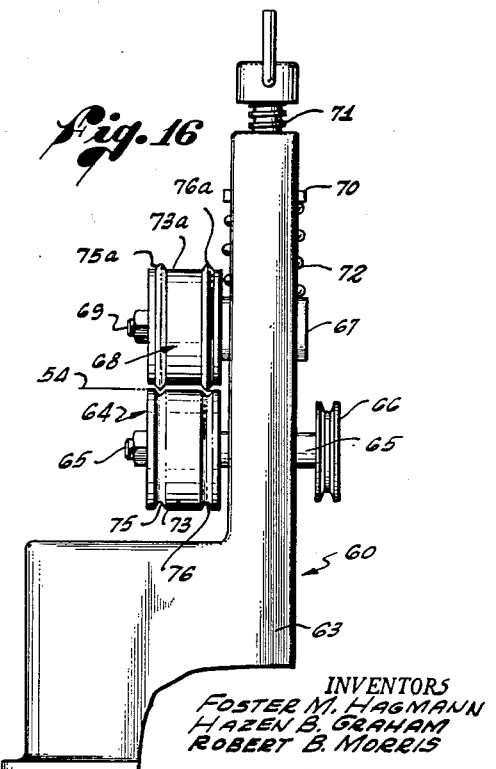

United States Patent Office 3,122,116
Patented Feb. 25, 1964

3,122,116
SEAL
Foster M. Hagmann, 1001 3rd St., Santa Monica, Calif.;
Hazen B. Graham, 746 Cory Drive, Inglewood 3, Calif.;
and Robert B. Morris, 20616 Quedo Drive, Woodland
Hills, Calif.; said Graham and said Morris assignors of
seven and one-third percent to said Foster M. Hagmann
and seven percent to Wanda L. Pratt, Santa Monica,
Calif.
Filed Mar. 14, 1960, Ser. No. 14,707
8 Claims. (Cl. 113—80)

This invention relates generally to seals and sealing devices. More particularly, this invention relates to self-sealing closures in the form of strip seals or caps which can be economically manufactured for use respectively in dual pane windows and on disposable containers, such as beverage bottles or the like.

There are in use a wide variety of seals. Sealing closures are used, for example, on such containers as bottles, jars, cans, etc. which are provided with cork, cardboard, rubber or other forms of sealing material. Such seals are of limited utility, particularly from the standpoint of initial hermetic or vacuum sealing and also from the standpoint of reusability. The inefficiency of the seal limits the shelf life of the product before initial opening and use and also the period of use of the product, since the container cannot effectively be resealed, once it has been opened.

While the disadvantages of conventional sealing closures have long been known, other types of seals have not been developed, because the cost of a precision fitted seal having an effective sealing design has been too great for use in mass produced articles, such as disposable containers, double pane windows, etc.

Sealing devices of the O-ring type are well known for use in precision equipment and have many advantages. They will seal effectively under light sealing pressures, and will seal against either a high fluid pressure or a vacuum. In addition, they are fully reusable, non-contaminating and impervious to most all chemicals and substances. However, effective O-ring sealing is dependent upon having the correct volumetric relationship between the O-ring and the groove or confining void space and requires close tolerance fits, precision machining work, closely controlled inspection and testing, and other manufacturing techniques which are inherently expensive. Moreover, a loose O-ring, as would be provided by the conventional O-ring and groove relationship, is not desirable in a container closure, particularly where the shelf life of an edible product in the container depends upon the effectiveness of at least the initial seal. For these reasons, it has not heretofore been taught that O-ring sealing could be successfully used in low cost mass produced container closures.

In such applications as double pane windows having an evacuated space between the panes, it is similarly necessary to maintain an effective seal with a relatively low cost sealing device.

With the foregoing in mind, it is an object of this invention to provide a sealing closure which will seal effectively and which may be economically mass produced.

It is another object of this invention to provide an improved method and apparatus for applying a sealing closure.

It is a still further object of this invention to provide a method and apparatus for forming a sealing closure, wherein a resilient deformable sealing material is flowed into a groove in the retaining body of the closure so that all of the material is below the plane of a part contacting surface of the closure and wherein a wall of the groove is then deformed to force a central portion of the material above this plane so that the portion of material above the plane is volumetrically substantially equal to the void of the groove below the plane.

Another object of the invention is to provide a method and apparatus for forming and shaping a closure body around a sealing ring or strip molded into the body by utilizing the molded material to control the final shape and size of the body.

It is also an object of this invention to provide a sealing closure which may be adapted to various types of container closures or caps to strip seals and the like, and which undergoes sufficient physical deformation upon sealing engagement to overcome surface irregularity in the opposed face without danger of leakage.

Other objects, features, and advantages of the present invention will be more fully apparent to those skilled in the art from the following detailed description taken in connection with the accompanying drawings in which like reference characters refer to like parts throughout and wherein:

FIGURE 5 is a diagrammatic view of a punch and die arrangement in a press for further shaping the seal to the desired void-volume relationship.

FIGURE 7a is a diagrammatic elevational sectional view, partly broken away, showing the relationship of the structure of FIGURE 6 to the punch and die of the apparatus in FIGURE 5.

FIGURE 7b is a view similar to FIGURE 7a illustrating how the desired volume-void relationship is maintained by the action of the punch and die, when more than a normal amount of plastic material has been poured into the groove.

FIGURE 7c is a view similar to FIGURE 7a, but illustrating the same effect, when less than the normal amount of sealing material has been poured into the groove.

FIGURES 8a, 8b, and 8c are diagrammatic sectional views illustrating the progressive phases of the process of sealing the cap on a bottle.

FIGURE 9 is a fragmentary perspective view of a strip of sheet material having grooves rolled therein to form a blank for the manufacture of a strip seal.

FIGURE 10 is a view similar to FIGURE 9, but showing the manner in which the grooves are filled with plastisol.

FIGURE 11 is a view similar to FIGURE 10 showing the strip after the back of the grooves have been indented to force the plastisol into a sealing crown.

FIGURE 12 is a perspective view of the strip of FIGURE 11 after it has been folded so that the grooves are back to back to form a two sided strip seal.

FIGURE 13 is a perspective view of a sealing corner block member.

FIGURE 14 is a perspective assembly view showing the manner in which strip seals of the type shown in FIGURE 12 may be assembled with a corner block of the type shown in FIGURE 13 to form a rectangular sealing assembly.

FIGURES 15 and 16 are front and side views, respectively, which diagrammatically illustrate a roll press of the type suitable for producing the indentations of the type shown in FIGURE 11.

Figure 1:
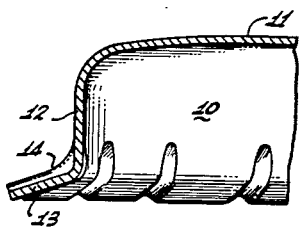
FIGURE 1 is a central elevational sectional view, partly broken away, of a crown-type bottle cap.
Figure 2:
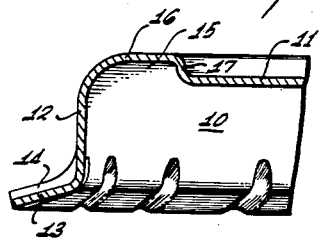
FIGURE 2 is a view similar to FIGURE 1, showing the cap after the first step in forming a groove therein.
Figure 3:
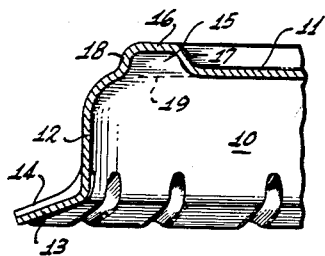
FIGURE 3 is a view similar to FIGURE 1, showing the cap after the second step has completed the groove which is ready to accept sealing material.

Turning now to the drawings, there is shown in FIGURES 1, 2, and 3 a series of partial cross sections of a typical crown-type bottle cap at various stages of its preliminary shaping for use in the present invention. In FIGURE 1, the cap 10 is shown having a central substantially circular crown-shaped portion 11 having an integral downturned flange 12 thereon. The bottom edge 13 of the flange 12 flares outwardly and is serrated in the usual manner, as by a plurality of ridges 14 stamped therein. The cap 10 is stamped or punched from a thin sheet of workable metal, such as thin coated steel or the like.

Caps of the type shown in FIGURE 1 are, of course, known in the art and are readily available on the open commercial market or can be punched or stamped from sheet metal in any convenient conventional manner. In accordance with the present invention, an annular groove 15 is next stamped around the periphery of the upper central portion 11 of the cap. Conveniently, the groove 15 may be formed in two stamping operations from the blank shown in FIGURE 1. The first operation produces a cross section of the type shown in FIGURE 2. It will be noted that the central portion 11 has been stamped or urged downwardly from its peripheral portion 16 to which it is connected by a portion 17 which ultimately forms a sidewall of the groove 15. The peripheral portion 16 of the cap forms the bottom wall of the groove 15.

It will be understood that the wall 16 is referred to as the "bottom wall" of the groove 15, even though it is shown at the top or uppermost part of the drawing as the cap is positioned therein. The wall 16 is considered to be the "bottom" since the groove 15 is deemed to be recessed downwardly from part engaging surface 11. Nothing more than a matter of terminology is involved and for our present purpose it is convenient to define the wall 16 to be the bottom wall of groove 15 in any position in which the cap 10 may be held.

The forming of the groove 15 is completed by the step illustrated in FIGURE 3, wherein the junction of the downwardly extending flange 12 and the peripheral portion 16 is stamped inwardly to form a shoulder portion 18 which serves as the outer side wall of the groove 15.

The stamping operations necessary to shape the cap from the configuration shown in FIGURE 1 to that shown in FIGURE 3 can be carried out on any conventional apparatus well known in the art. It should be pointed out, however, that most such apparatus will function satisfactorily only within reasonable tolerance ranges and that it is, therefore, not economically feasible to specify the volume of the groove 15 with any really high degree of precision. The present invention is adapted to accept crown cap blanks stamped in the configuration illustrated in FIGURE 3 having the volume of the groove 15 specified only to within a reasonably large tolerance range, since correction for deviation from the desired value is provided for in a manner to be described below. The volume of the groove 15 in FIGURE 3 may be defined as the volume enclosed within bottom wall 16, side wall 17, side wall 18, and the plane indicated by the dashed line 19.

The dashed line 19 in FIGURE 3 indicates the plane of the part engaging surface of the cap, which is also the plane of the top of the groove. That is to say, the lower surface of the central portion 11 of the cap when projected on across the groove 15 will merge with the bottom of the shoulder 18 and the inner edge of the downturned flange 12 to form the plane which is adapted to seat on the top of the bottle or other container to be sealed or closed by the cap or closure member 10.

Figure 4:
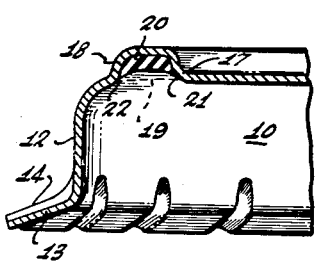
FIGURE 4 is a view similar to FIGURE 3 and showing the cap and the sealing material which has been poured into the groove.

The next step in forming the sealing closure in accordance with the present invention is illustrated in FIGURE 4 which shows a partial section of the crown-type bottle cap having a plastisol sealing ring 20 installed and cured in the groove 15. Although it is preferred to use a plastisol which can be flowed or poured in liquid form into the groove 15 when the cap is inverted from the position shown in FIGURES 3 and 4, it will, of course, be understood that any suitable substantially incompressible resilient deformable sealing material can be used. The liquid plastics of the type which can be poured and molded directly in the groove 15 are particularly suitable for use herein. In particular, it will be noted from FIGURE 4 that the viscosity of the liquid plastisol is such that it is attracted to the walls of the groove 15 at the edges of the surface of the plastisol. It will further be noted that the junction of the surface of the plastisol with the walls 17 and 18 of the groove 15, that is, the junction points 21 and 22, as shown in FIGURE 4, lie below the plane 19 of the part engaging surface of the cap. The term below is used here since, as noted above, the wall 16 of groove 15 is considered the bottom of the groove. Furthermore, the entire surface area and volume of the plastisol seal 20 lies below the plane 19 by virtue of the above noted viscosity of the liquid being such as to attract the plastisol to the side walls 17 and 18.

Normally, it is intended that the volume of the plastisol sealing material 20 shall be such as to occupy slightly more than half of the volume of the groove 15. However, in accordance with the present method, economy of manufacture is facilitated in that provision is made to tolerate considerable variation from the normal desired amount shown in FIGURE 4. The manner in which variations from this amount are compensated for, will be described in detail below. At this point, however, it should be pointed out that the showing in FIGURE 4 represents substantially what is considered an average amount of plastisol intended to be placed in the groove 15. As noted above, this material is flowed into the groove and molded and cured therein. This flowing operation can be performed in any convenient conventional manner either by automatic apparatus or by hand pouring. No particularly precise or close control over the exact amount of material poured into the groove is required.

The final shaping step in the manufacture of the sealing device is such as to automatically compensate for or correct tolerance variations either in the initial volume of the groove 15 or in the volume of plastisol or other sealing material 20 poured into the groove. This final shaping step may, for example, be carried out on apparatus of the type shown in FIGURE 5.

In FIGURE 5, there is shown somewhat diagrammatically a conventional stamping press provided with a spring loaded punch 23 and a die 24. The die has a preformed cavity 25 between high points 26 and 27, respectively, which cooperate with the cavity 25 to create an optimum void-volume ratio by the operation of the press on the cap. As may be seen in FIGURE 5, the die 24 is securely positioned on any conventional supporting base plate 28 and then the cap blank 10 in the state in which it is shown in FIGURE 4 is positioned on the die 24. The punch 23 is connected in depending relationship to the movably mounted press member 29 by a spring 30. Any conventional power actuated means may be provided to move the press 29 carrying the spring loaded punch 30 up and down in a vertical direction on the support members 31.

Figure 6:
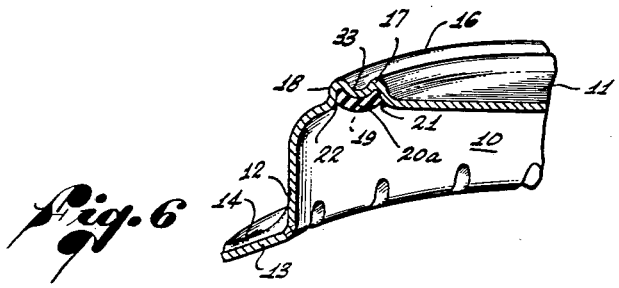
FIGURE 6 is a perspective view, partly broken away, showing a completed cap and seal, where the normal amount of sealing material has been used.

The punch 23 has an annular depending tip member 32, the lower surface of which is semi-toroidal in shape and which is positioned to register with the bottom wall 16 of groove 15 when the punch descends. The tip 32 deforms the top wall 16 of the groove 15 to form the indentation 33 shown, for example, in FIGURE 6. In FIGURE 6, it will be noted that the crown-type bottle cap 10 with the plastisol or other sealing material 20 molded in the groove 15 has been deformed by the indentation at 33 so as to create the proper void-volume relationship between the groove and the sealing material. It will be noted that the points 21 and 22 have been held in the same position relative to the side walls 17 and 18 as was occupied by these points at the stage of manufacture shown in FIGURE 4, wherein the groove 15 had not been deformed by the punch. The action of the punch in deforming the groove 15 by shaping the indentation 33 in the surface 16 thereof, however, urges the central portion of the sealing material 20 out of the groove and above the plane of the part engaging surface of the cap which is indicated in the drawings by the dashed line 19.

In particular, it will be noted that there is a portion 20a of the material 20 shown in FIGURE 6, which projects above or inwardly from the plane of the part engaging surface 19 so that the portion 20a of the sealing material would contact the surface on which the cap is positioned before this surface is contacted by the lower surface of the portion 11 and side 12 of the cap. This portion 20a is, however, of a volume which is at most equal to and preferably slightly less than the volume of the void left in groove 15 on the inner side of line 19. Because of this equal volumetric relationship between the projecting sealing material and the void in the groove, the deformable sealing material can all be accommodated within the groove 15 when the cap is placed on the bottle or other container, as will be described in greater detail below. It has been found that this equal volumetric relationship using an essentially incompressible, but resilient and deformable sealing material, leads to a highly effective and efficient seal. It is one of the purposes of the present invention to insure this relationship in spite of manufacturing tolerances in the size of the groove 15 and the amount of sealing material 20 originally deposited therein.

The manner in which this equal void-volume relationship is achieved, in spite of varying tolerance conditions, may best be seen from a consideration of FIGURES 7a, 7b, and 7c. FIGURE 7a is a partial section of the crown-type bottle cap 10 with the normal amount of plastisol 20 deposited in the normal size groove therein. The figure shows the sizing punch 23 and the die 24 partially disengaged. FIGURE 7b is similar to FIGURE 7a, but shows the same situation where more than the normal amount of plastisol or other sealing material has been deposited in the groove 15. FIGURE 7c is again similar to FIGURE 7a, but shows the situation when less than the normal amount of plastisol has been deposited in the groove 15. Of course, it will be understood that although the drawings illustrate a variation in the amount of sealing material, similar considerations will apply to variations in the size of the groove. Thus, depositing too much material in a normal size groove, as in FIGURE 7b, is the same in principle as depositing the normal amount of material in a groove which is too small. Conversely, depositing too little material in a normal size groove, as in FIGURE 7c, is the same as depositing the normal amount of material in a groove which is too large.

In operation, the spring loaded punch 23 co-acts with the die 24 having the preformed cavity 25 and high points or ridges 26 and 27 thereon to secure the optimum void-volume ratio by insuring that the inner surface of the cap member 10 has the desired configuration determined by conformity to the configuration of the outer surface of the die 24. Thus, in operation, the spring loaded punch descends, deforming or indenting the top 16 of the groove 15 to form the indentation 33 and thereby pushing the plastisol 20 ahead of it until the cavity 25 in the upper surface of the die is fully occupied. The press member 29 shown in FIGURE 5 continues the full extent of its travel which travel is greater than is normally required to be executed by the punch 23 in order to fill the cavity 25. The extra travel of punch press member 29 is accommodated by compression of the spring 30. Of course, it will be understood that the spring 30 is such that a slightly greater force is required to compress it than is required to deform the cap member 10 so that the spring 30 is not compressed until the punch 23 is resisted not only by the cap member 10 and plastisol 20, but also by the seating of the plastisol on the die 24. Thus, although the press continues to the extreme of its travel, the spring loaded punch will have no further effect on the plastisol 20.

The operation of the press in the situation illustrated in FIGURE 7b is essentially the same in principle. The difference, of course, is that the spring loaded punch does not have to descend as far as in FIGURE 7a before its travel is stopped by the resistance of the die 24. Again, the excess travel of the press 29 (which here is greater than in FIGURE 7a) is taken up by compression of the spring 30. Thus, the only differences in the action of the press in the situations illustrated in FIGURES 7a and 7b is that the indentation 33 formed in the top surface 16 of the groove by the punch 23 is not as great in FIGURE 7b as it is in FIGURE 7a. The travel of the press 29 is exactly the same and the difference in travel of the punch 23 is taken up by the spring 30. Furthermore, the inner surface of the cap 10 has the same configuration conforming to the outer surface of the die 24 in both FIGURES 7a and 7b so that in both instances the same desired void-volume relationship is automatically achieved.

Similar considerations, of course, apply to the situation illustrated in FIGURE 7c except that in this instance the punch 23 has a longer path of travel than in the normal case illustrated in FIGURE 7a in order to compensate for the deficiency in the volume of the sealing material 20 by making the indentation 33 deeper in the groove 15 and thereby urging the sealing material into complete contact with the surface of cavity 25 in die 24. Again, the desired equal volumetric void-volume relationship is automatically achieved.

Th cap or closure device which is sold as an article of manufacture resulting from the process of manufacture illustrated in FIGURES 7a, 7b, and 7c, is shown in the broken away perspective view of FIGURE 6. It will be noted that the deformation or indentation 33 which has been formed in the groove 15 of the cap 10, is of a depth and in a direction, such as to cause a portion 20a of the sealing material 20 to be urged or to project upwardly from the bottom of the groove beyond the plane of the part engaging surface indicated by the dashed line 19. The volume of this protruding portion 20a of sealing material is equal to or slightly less than the volume of the void spaces left in the groove adjacent points 21 and 22 on either side of the groove which have not been moved.

It will be understood that throughout the specification the word indent or indentation is used to mean any deformation of any portion of any wall of the groove, such as to urge the sealing material molded into the groove to be displaced outwardly from the groove. It is apparent that other shapes or types of deformations or indentations differing from that shown specifically at 33 in the drawings could be used to achieve the same desired equal volumetric void-volume relationship.

The cap as shown in FIGURE 6, is intended to be applied to the top of a bottle or other container in the standard manner, using the conventional bottle capping press equipment. The capping process is illustrated in FIGURES 8a, 8b, and 8c at three different stages of operation of the press as it seals the cap 10 onto the top of a bottle 40.

The conventional bottle capping press includes a pressure foot 41 and a crown block 42 which are adapted to be seated downwardly on the top of the bottle and are mounted for vertical motion with respect to each other, as well as with respect to the top of the bottle. As will be noted, the outer diameter of the pressure foot 41 is essentially equal to the outer diameter of the largest part of the top lip of the bottle, whereas the inner diameter of the crown block 42 (which is mounted concentrically with the pressure foot 41) is substantially equal to the outer diameter of the depending flange 12 of the cap 10 when this flange is seated in sealed relationship to the upper lip 43 of the bottle 40. The lower end of the crown block 42 is flared or tapered outwardly as at 44 to accommodate the outwardly flared bottom edge 13 of the flange 12 of cap 10.

In FIGURE 8a it will be noted that the crown-type bottle seal is installed on the bottle 40 with the pressure foot 41 in contact with the cap 10. It is seen that both the protruding portion 20a of the seal 20 and the lower surface of the central portion 11 of the cap 10 are in contact with the lip 43 of the bottle 40. The position of the part shown in FIGURE 8a is, of course, the first stage in the capping operation.

The second stage of this operation is shown in FIGURE 8b, where it will be noted that the crown block 42 has partially descended around the outer flange 12 of the cap 10. It will be seen that the small radii of the groove resist deformation and that the radius adjacent to point 21 acts as a fulcrum. That is to say, the outer portion of the cap pivots about point 21 as a fulcrum, as the crown block descends and urges the flange 12 inwardly. It should be noted in FIGURE 8b that the points 21 and 22, where the sealing material 20 contacts the side walls of the groove 15, have not changed their position relative to the side walls of the groove. A portion of the protruding sealing material 20a has, however, been urged back into the groove, thereby reducing the volume of the void left in the groove below the line 19. Of course, the pivoting about point 21 also bends the "plane" of the part engaging member 11 to begin to conform with the curved upper surface 43a of the lip 43 of the bottle.

In FIGURE 8c, there is shown a partial cross section of the completed crown-type bottle cap 10 at the moment capping is completed. It will be noted that the radius adjacent to point 22 has now contacted the upper lip 43a of the bottle, thereby confining the plastic sealing material in the groove 15. That is to say, the lower surface of the central part engaging portion 11 contacts the upper inner edge of the bottle at the inner wall 17 of groove 15; and the upper inner surface 12a of the flange (where this flange merges with the side wall 18 of the groove 15) contacts the upper portion 43a of the lip 43 of the bottle 40. Of course, the surface projection represented by the dashed line 19 has, therefore, now been bent around the point 21 as a fulcrum so that this surface projection 19 now conforms exactly with the top surface of the lip 43 of the bottle 40.

It will be noted in FIGURE 8c that immediately adjacent to the points 21 and 22 and above the top of the lip 43 of the bottle, there remains two areas which are not entirely filled by the deformed sealing material. This void remaining within the groove in the fully sealed condition, represents the residual tolerances which do not in any way impair the effectiveness or efficiency of the sealing arrangement. That is to say, the above discussed relationship between the volume of the sealing material 20a which is originally protruding beyond the line 19 and the volume of the void space in the groove 15 in back of the line 19 into which the protruding material is deformed in the sealing operation, will be understood to be one of substantial or approximate equality. The tolerance in this respect should be on the low side with respect to the volume of protruding material. That is to say, the volume of the protruding material should not exceed the volume of the void left in the groove and should be substantially equal to the volume of the void. However, if as shown in FIGURE 8c, the volume of the protruding material is not quite equal to the volume of the void, an effective seal can still be obtained. The lower limit in this respect is set by the fact that there should be sufficient sealing material protruding out of the groove before the capping operation, so that the deformation of the sealing material will exert sufficient force on the top of the lip of the bottle to give good tight sealing action.

It will be noted from FIGURE 8c that a metal to glass contact is made by the cap on the bottle at the point 11a where the under surface of the central part engaging portion 11 contacts the lip of the bottle at point 43b and at the point 12a, where the upper inner edge of the downwardly extending flange 12 contacts the point 43a on the outer edge of the lip 43 of the bottle 40. Between these two points which are in fact, of course, annular line contacts or ridges extending around the lip, the sealing material 20 has a broad area contact 20b with the lip of the bottle which area contact is maintained under sealing pressure by the deformation of the sealing material 20. Of course, the cap 10 is held in position on the top of the bottle and the above noted sealing pressure is thereby maintained by the deformation of the lower portion of the flange 12 and the outwardly flaring portion 13 to seat under the shoulder 44 at the lower edge of the lip 43 of the top of bottle 40. This manner of locking the cap in position is the usual conventional and well known method. It serves, however, to cooperate with and make possible the novel sealing device and method of the present invention.

Another embodiment of the sealing method and device discussed in detail above, is illustrated in FIGURES 9 through 16 depicting the formation of a strip rather than an annular seal structure. The strip seal illustrated in FIGURES 9 through 16 may, for example, be used between the edges of the opposed or sandwiched panes of glass in a double pane window having the space between the panes evacuated for heat insulation purposes. In this particular application of the strip seal, it is desired to have an inexpensive efficient seal arrangement which can readily be cut to various lengths to suit the needs of particular custom installations. It will, of course, be understood, however, that the above suggested use with double pane windows is illustrative only and that the strip seal to be described may well find application in many other similar devices.

There is shown in FIGURE 9 a fragmentary perspective view of a strip 50 of relatively thin workable sheet metal which forms the starting blank from which the seal is manufactured. It will be noted that the strip 50 has grooves 51 and 52 stamped at the respective longitudinal edges thereof. There is thus defined between the grooves 51 and 52 a raised central portion 53 between the two peripheral grooves. The grooves 51 and 52 may each be formed in much the same manner as was the groove 15 shown in FIGURE 2.

It will be noted from FIGURE 9 that each of the grooves 51 and 52, respectively, have bottom walls 55 and 56 and that the grooves extend downwardly from the plane of the top of the central portion 53 as indicated by the dashed line 54 which extends the plane of the top of the central surface 53 outwardly to indicate the plane of the tops of the grooves 51 and 52. Thus, the top surface of the flat central strip 53 extended define the plane of the top of the grooves 51 and 52. As was true in the forming of the blank in the embodiment of the invention described above for a bottle cap, so also here it is true that the grooves 51 and 52 may be formed with any convenient conventionally known stamping technique and need not be held to precision tolerances, since the desired precision of void-volume relationship will be established at a later stage in the formation of the seal in a manner similar to that described above.

As may be seen from FIGURE 10, the next step in the manufacture of the seal is to flow or pour plastisol into each of the grooves to form strips 57 and 58 of resilient sealing material in the grooves, respectively. The plastisol is flowed into the grooves in approximately the desired amount so that its top surface will be slightly below the plane of the top of the groove. The flowed plastisol is then cured in the grooves.

The strip 50 is next run through a spring loaded roller press of the type shown in FIGURES 15 and 16 to produce the configuration of strip shown in FIGURE 11. It will be noted that the grooves 51 and 52 in FIGURE 11 have indentations 61 and 62, respectively, formed therein to thereby urge a poriton of the sealing material 57 and 58, respectively, above the plane 54 of the top of the groove in order to establish the desired void-volume relationship as described above in connection with the seal for the bottle cap. That is to say, the indentations 61 and 62 in the bottoms of the grooves are made just large enough or deep enough so that the volume of the portion of the sealing material 57 and 58 which is forced above the plane 54 of the top of the groove is nearly equal to but not greater than the volume of the void left in the groove below the plane 54 of the top of the groove. There is thus formed a sheet metal strip having two resilient sealing strips, one along each edge of the strip as shown in FIGURE 11, with each of the sealing strips having the desired void-volume relationship.

Turning now to FIGURES 15 and 16, the operation of the spring loaded roller press 60 will be self-evident from a comparison with the operation of the spring loaded press shown in FIGURE 5, since its operaiton is very closely analogous thereto. In particular, the press 60 comprises a body frame work 63 upon which is mounted a lower driven roller 64. The roller 64 is, of course, free to rotate with its driven axle 65 but is otherwise rigidly mounted with respect to the body frame 63. Axle 65 is conveniently provided with a gear or pulley 66 which is used as a power connection to any motor or convenient power source.

The frame or base 63 also has slidably mounted thereon a shoe 67 upon which is mounted an upper roll 68. The upper roll 68 is journalled on an axle 69 which is rigidly supported in the movable or slidable mounted shoe 67. A pressure plate 70 is also slidably mounted within the base 63 of the press and is connected to be driven or actuated by a screw 71 which in turn may be actuated by any convenient mechanical or hydraulic means. The shoe 67 is connected to the pressure plate 70 by the spring 72.

In operation, the strip or sheet 50 in the condition shown in FIG. 10, that is, having plastisol sealing material 57 and 58 molded into its grooves 55 and 56, is fed between the lower roller 64 and the upper roller 68 of the press 60. It will be apparent particularly from FIGURE 16 that the lower roller 64 has a central flat portion 73 which is adapted to receive the upper surface of the central flat portion 53 of the strip 50 shown in FIGURE 9. Thus, the peripheral edge of the lower roller 64 defines the plane 54 which is the plane of the top of the groove. The roller 64 also has a pair of peripheral grooves 75 and 76 cut therein. These grooves serve as dies and are complementary to the top surface of the protruded sealing material 57 and 58 of the form shown in FIGURE 11. That is to say, the strip as shown in FIGURES 9 through 11 is inverted before being placed through the rollers.

The upper roller 68 which is the spring mounted roller has a central portion 73a opposite to and complementary with the portion 73 of the lower roller and which is adapted to seat on and form the under surface of the central member 53 shown in FIGURES 9 through 11. The upper roller 68 also has protrusions 75a and 76a peripherally thereon at the edges of the central flat portion 73a which protrusions are adapted to form the indentations 61 and 62 in the strip 50 shown in FIGURE 11.

Thus, in order to form the indentations 61 and 62, the strip 50 in the state shown in FIGURE 10 is turned upside down and fed between the upper and lower rollers 64 and 68. The lower roller being rigidly mounted with respect to the vertical direction of the press, serves as a die to define the shape of the upper surface of the strip. Sufficient force is applied to the screw 71 so that it urges the pressure plate downwardly. This in turn compresses the spring 72 which urges the shoe 67 carrying the indentation forming or punching roller 68 thereon downwardly into contact with the strip 50 to be formed and shaped.

As the strip is passed between the rollers, the upper surface of the strip 50 will assume a shape and configuration which is exactly complementary to the shape and configuration of the fixedly journalled lower roller 64 which is acting as a die to define its surface. Any irregularity or lack of precision either in the formation initially of the grooves 51 and 52 or in the amount of sealing material or plastisol poured into the grooves will be taken up by flexibility of the spring 52 resulting in differences in the depth of the indentations 61 and 62 as was the case in the previously described bottle cap embodiment. Hence, after passing through the press shown in FIGURES 15 and 16, the strip 50 of the type shown in FIGURE 10 will assume the form shown in FIGURE 11 and the material 57 and 58 protruding from the grooves will be such that the volume of the protruding material is nearly equal to and certainly not greater than the volume of the void remaining in the grooves.

The strip in the form shown in FIGURE 11 is then bent to assume the configuration shown in FIGURE 12. This latter shaping operation may readily be accomplished by any known punch or similar apparatus. It will be noted that the deformation is such that the central portion 53 is bent into a nearly circular cross section so that the two indentations 61 and 62 in the bottoms of the grooves 51 and 52 are placed in opposed relationship to each other. There is, consequently, formed a strip which has been folded so that the grooves are back to back to form a two sided strip seal. That is to say, the protruding sealing material 57 and 58 is in back to back relationship so that it may readily be placed between two opposed panes of glass or any other similar sandwiched members.

Where the two sided sealing strip is to be used with double pane glass, a problem will arise as to how the corners may best be sealed. It is apparent that a strip of the type shown in FIGURE 12 can be cut to any desired length, but cannot readily be bent to form a corner without totally destroying the desired relationship.

Consequently, it is convenient to provide a corner block such as the corner block 80 shown in FIGURE 13. This corner block 80 may basically comprise a generally cubical piece of metal 81 having diagonally disposed grooves cut in the top and bottom surfaces thereof which grooves in turn are connected at their ends by vertically disposed grooves.

There is then inserted in the grooves strips of sealing material preferably the same as the plastisol material used to fill the grooves in the strips shown in FIGURES 9 through 12. Thus, the diagonally disposed grooves in the top surface has molded therein a strip 82 of sealing material which protrudes therefrom to the same extent that the strip 57 protrudes from groove 51. Similarly, the diagonally disposed groove in the bottom surface has a protruding strip 83 of molding material formed therein. The two ends of the strips 82 and 83 are connected by vertically disposed strips 84 and 85 in the two edges of the corner block 80. As may be seen in FIGURE 14, two strips 50' and 50" of the same type as the strip 50 shown in FIGURES 9 through 12 may thus be joined to form a right angle corner assembly of the type shown in FIGURE 14. It will be noted that the strip 50' abuts against the strip 84 of sealing material, whereas the strip 50" abuts against the strip 85 of sealing material in the corner block 80. Of course, the dimensions of the corner block are chosen to correspond with the desired necessary dimensions of the strip 50 in order to achieve this result. It will be understood that both the strips 50' and 50" and the corner block 80 are positioned between opposed panes of glass or other opposed members which in turn are held in opposed relationship by any suitable conventional frame work, such as a window frame or other means after the space between the panes has been evacuated.

There is thus formed an economical effective seal which may be readily adapted to fit the dimensions of any desired custom installation. That is to say, the corner block 80 will be of standard size determined by the cross sectional dimensions of the strip 50. The strip 50 in turn may be cut to any desired length at any points thereon simply by making a straight transverse cut across the strip without in any way deforming its other dimensions.

While particular exemplary preferred embodiments of the invention have been described in detail above, it will be understood that modifications and variations therein may be effected without departing from the true spirit and scope of the novel concepts of the present invention, as defined by the following claims.

We claim:

1. The method of manufacturing a sealing cap member having a resilent deformable packing ring therein, comprising the steps of: providing a cap member having a part engaging surface with an annular recessed groove therein; flowing a packing ring formed of a resilient, deformable, and substantially incompressible material into said groove so that all of said material is below the plane of said part engaging surface; and indenting a wall of said groove to force a part of said material above said plane of said part engaging surface and to volumetrically size said groove with respect to said material so that the volume of said material above said part engaging surface is substantially equal to the remaining void of said groove below said part engaging surface.

2. The method of manufacturing a bottle sealing cap comprising the steps of: forming an annular recessed groove in the bottle lip engaging surface of a crown-type sheet metal cap; partially filling said groove by flowing a substantially incompressible resilient deformable sealing material therein, all of said material initially being below the plane of said lip engaging surface; and indenting a wall of said groove to force a predetermined volume of said material to protrude outwardly beyond said plane of said lip engaging surface and to volumetrically size said groove to said material so that the volume of said protruding material is substantially equal to, but no greater than, the void remaining within said groove.

3. The method of manufacturing a sealing device comprising the steps of: forming an annular recessed groove in a part engaging surface of a sheet metal closure members; partially filling said groove by molding a substantially incompressible resilient deformable sealing material therein; placing said closure member on a die having a surface complementary to the part engaging surface of said closure member and including a surface portion defining the desired surface configuration of said material in said groove; and deforming a wall of said groove to force said material against said groove configuration defining surface of said die.

4. The method of manufacturing a sealing closure strip comprising the steps of: providing a strip of elongated sheet metal having a flat surface with a recessed groove at each edge thereof; flowing a substantially incompressible resilient deformable material into each of said grooves; indenting a wall of each of said grooves to volumetrically size said groove to provide a predetermined void-volume relationship between said groove and said material therein; and deforming said flat surface to place said grooves and material therein in back to back relationship to form a two sided strip seal.

5. The method of manufacturing a two sided strip sealing closure member comprising the steps of: forming a pair of recessed grooves at opposed edges of a strip of sheet metal; partially filling each of said grooves by flowing a substantially incompressible resilient deformable packing material therein; deforming a wall of each of said partially filled grooves to urge a portion of said material out of said groove to produce a predetermined volumetric relationship between the material protruding out of said groove and the void remaining in said groove; and bending said sheet metal to position said grooves in back to back relationship to each other.

6. The method of manufacturing a sealing device comprising the steps of: forming a recessed groove in a part engaging surface of a member formed of a thin workable sheet material; flowing a resilient, deformable and substantially incompressible sealing material into said groove to a level below the plane of said part engaging surface; and indenting the bottom wall of said groove to force a portion of said material above the plane of said part engaging surface and to volumetrically size said groove with respect to said material so that the volume of said material above said part engaging surface is substantially equal to the remaining void within said groove below said part engaging surface.

7. The method of manufacturing a sealing device comprising the steps of: forming a recessed groove in the part engaging surface of a member formed of a thin workable material; molding a resilient, deformable and substantially incompressible material into said groove to a level below said part engaging surface; placing said member on a die having a region with a surface complementary to the part engaging surface of said member and including a surface portion defining the desired surface configuration of said material in said groove; and indenting a wall of said groove to force a portion of said material out of said groove beyond said part engaging surface and against said surface portion, said surface portion being shaped so that the volume of the portion of said material forced out of said groove is substantially equal to the void remaining within said groove below said part engaging surface.

8. The method of manufacturing a sealing closure comprising the steps of: forming a continuous recessed groove in the part engaging surface of a closure member formed of a thin workable sheet material; molding a resilient, deformable and substantially incompressible sealing material into said groove to a level slightly below said part engaging surface; placing said closure member on a die having a first region with a surface complementary to said part engaging surface, and a second region formed with a continuous cavity subjacent said groove and with continuous inner and outer ridges bounding said cavity and projecting into said groove adjacent its side walls; and, thereafter, indenting the bottom wall of said groove to force a portion of said material to protrude out of said groove beyond said part engaging surface and against the surface of said cavity to make it conform to the shape of the same and thereby produce a predetermined volumetric relationship between the volume of said protruding portion and the void remaining within said groove.

References Cited in the file of this patent

UNITED STATES PATENTS

| | | |
|---|---|---|
| 1,860,880 | McManus | May 26, 1931 |
| 1,861,589 | Worth | June 7, 1932 |
| 1,928,987 | Warth | Oct. 3, 1933 |
| 1,956,012 | Egan | Apr. 24, 1934 |
| 2,184,281 | Clark | Dec. 26, 1939 |
| 2,199,528 | Sebell | May 7, 1940 |
| 2,327,454 | Punte | Aug. 24, 1943 |

FOREIGN PATENTS

| | | |
|---|---|---|
| 484,741 | Italy | Sept. 18, 1953 |